United States Patent
Asaduzzaman et al.

(10) Patent No.: US 7,089,444 B1
(45) Date of Patent: Aug. 8, 2006

(54) CLOCK AND DATA RECOVERY CIRCUITS

(75) Inventors: Kazi Asaduzzaman, Milpitas, CA (US); Wilson Wong, San Francisco, CA (US)

(73) Assignee: Altera Corporation, San Jose, CA (US)

(*) Notice: Subject to any disclaimer, the term of this patent is extended or adjusted under 35 U.S.C. 154(b) by 394 days.

(21) Appl. No.: 10/670,147

(22) Filed: Sep. 24, 2003

(51) Int. Cl.
   *G06F 1/04* (2006.01)
(52) U.S. Cl. .............. 713/600; 713/503; 375/376
(58) Field of Classification Search ............ 713/600, 713/503; 375/376
   See application file for complete search history.

(56) References Cited

U.S. PATENT DOCUMENTS

| | | | |
|---|---|---|---|
| 4,953,185 A * | 8/1990 | Goode ................. | 375/354 |
| 5,056,118 A | 10/1991 | Sun | |
| 5,164,966 A | 11/1992 | Hershberger | |
| 5,329,559 A | 7/1994 | Wong | |
| 5,572,167 A * | 11/1996 | Alder et al. ............ | 331/2 |
| 6,058,151 A | 5/2000 | Huang | |
| 6,215,835 B1 | 4/2001 | Kyles | |
| 6,236,697 B1 * | 5/2001 | Fang ................. | 375/376 |
| 6,516,422 B1 * | 2/2003 | Doblar et al. .......... | 713/503 |
| 6,920,622 B1 * | 7/2005 | Garlepp et al. ........ | 716/6 |
| 2002/0145480 A1 * | 10/2002 | Saito ................. | 331/100 |

* cited by examiner

*Primary Examiner*—Thomas C. Lee
*Assistant Examiner*—Vincent Tran
(74) *Attorney, Agent, or Firm*—G. Victor Treyz (57) ABSTRACT

Clock and data recovery circuitry is provided that is used in integrated circuits such as programmable logic device integrated circuits. The clock and data recovery circuitry may recover digital data and an embedded clock from a high-speed differential input data stream. The clock and data recovery circuitry may have automatic mode switching capabilities. When operated in reference mode, the clock and data recovery circuit may use a first phase-locked loop to lock onto a reference clock. When operated in data mode, the clock and data recovery circuit may use a second phase-locked loop to lock onto the phase of the differential data stream. A control circuit may automatically switch the clock and data recovery circuit between the reference mode and the data mode. Override signals may be used to force the clock and data recovery circuit out of the automatic mode and into either the reference or data mode.

26 Claims, 6 Drawing Sheets

CLOCK AND DATA RECOVERY CIRCUITS

BACKGROUND OF THE INVENTION

This invention relates to clock and data recovery circuits, and more particularly, to clock and data recovery circuits with automatic mode switching and override capabilities for use in integrated circuits such as programmable logic devices.

High-speed data communications links are commonly used in modern digital systems to convey data between integrated circuits. Serial data links are often preferred over parallel links, because serial links avoid the problems with skew that are faced when parallel data and clock signals are transmitted across conductive traces and other paths through a system. A serial link with a high-speed data signal and an embedded clock has no skew, because the clock and data travel over the same communications path.

In a typical high-speed serial communications arrangement, a transmitter on an integrated circuit sends high-speed serial data to a receiver on another integrated circuit. The transmitter embeds a clock signal with the serial data. At the receiver, a clock and data recovery (CDR) circuit is used to extract the embedded clock. Once the clock and data recovery circuit has recovered the clock signal from the incoming data stream, the data can be deserialized and distributed to circuitry on the receiving integrated circuit.

Some clock and data recovery circuits use two phase-locked loops to recover the incoming data and clock. A first phase-locked loop locks onto a reference clock signal. Once the reference clock has been acquired, a second phase-locked loop is used to recover the embedded clock and data from the serial data stream.

It would be desirable to be able to provide improved clock and data recovery circuits for use in integrated circuits such as programmable logic devices.

SUMMARY OF THE INVENTION

In accordance with the present invention, clock and data recovery circuits for integrated circuits are provided. A clock and data recovery circuit may be used to recover data and an embedded clock from a stream of high-speed serial data that is provided to an integrated circuit over a differential data path. The clock and data recovery circuit may provide recovered data to a deserializer that converts recovered serial data into parallel digital data for use elsewhere on the integrated circuit.

The clock and data recovery circuit may use an architecture based on two phase-locked loops. The first phase-locked loop may have a phase/frequency detector with one input that receives a reference clock and another input that receives a feedback clock from the output of the phase-locked loop. The first phase-locked loop may be used to lock onto the reference clock.

The second phase-locked loop may have a phase detector with an input connected to the feedback clock and an input that receives the incoming high-speed differential data stream. The second phase-locked loop may lock onto the differential data stream to extract the embedded clock. Once the embedded clock has been acquired by the second phase-locked loop, the data may be recovered from the incoming data stream and may be provided to the deserializer.

The first and second phase-locked loops may share circuitry such as a charge pump, loop filter, and voltage controlled oscillator. The charge pump may contain a switch circuit that allows either the phase/frequency detector of the first phase-locked loop or the phase detector of the second phase-locked loop to be switched into use. The switch circuit may be controlled by a control signal from a control circuit.

When the clock and data recovery circuit is using the first phase-locked loop to lock onto the reference clock, the clock and data recovery circuit may be said to be in "reference" mode. When the clock and data recovery circuit is using the second phase-locked loop to lock onto the incoming data signal, the clock and data recovery circuit may be said to be in "data" mode.

The control circuit may automatically switch between the reference mode and the data mode. For example, upon powering up the integrated circuit on which the clock and data recovery circuit is located, the control circuit may place the clock and data recovery circuit into reference mode. An activity detector and lock detectors may be used to sense when the first phase-locked loop has successfully locked to the reference clock. At this stage, the control circuit can automatically switch the operation of the circuit into data mode, where the second phase-locked loop is used to acquire the embedded clock from the data stream.

During operation in data mode, the second phase-locked loop may drift towards a harmonic of the clock or may otherwise lose its lock on the data signal. When the clock and data recovery circuit senses that the second phase-locked loop is no longer locked onto the data, the control circuit may automatically return the clock and data recovery circuit into reference mode. During normal operation, the control circuit may repeatedly switch the clock and data recovery circuit back and forth between the reference mode and the data mode.

When the control circuit automatically toggles the operation of the clock and data recovery circuit between reference mode and data mode, the circuit is said to be operating in "automatic" mode. Sometimes automatic mode operation is not desired by a system designer. Accordingly, the control circuit contains circuitry responsive to override signals. The override signals may, for example, be provided from an external source (i.e., a source off of the integrated circuit on which the clock and data recovery circuit is located). The override signals may also be provided from programmable elements on a programmable logic device or from programmed circuitry (core logic) on a programmable logic device.

The override signals may include a lock-to-reference signal and a lock-to-data signal. When the lock-to-reference signal is asserted, the control circuit switches the first phase-locked loop into use, thereby forcing the clock and data recovery circuit from automatic mode into reference mode. When the lock-to-date override signal is asserted, the control circuit switches the second phase-locked loop into use, thereby forcing the clock and data recovery circuit from automatic mode into data mode.

Processes (e.g., control processes) may be used to produce the override signals. The control processes may be implemented using hard-wired circuitry or programmable circuitry (e.g., programmable circuitry that is implemented in core logic on a programmable logic device).

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to integrated circuits such as programmable logic device integrated circuits and systems in which these integrated circuits communicate over serial communications links. The invention also relates to clock and data recovery circuitry for use in such serial communications links and methods for controlling the integrated circuits and the clock and data recovery circuitry.

Figure 1:
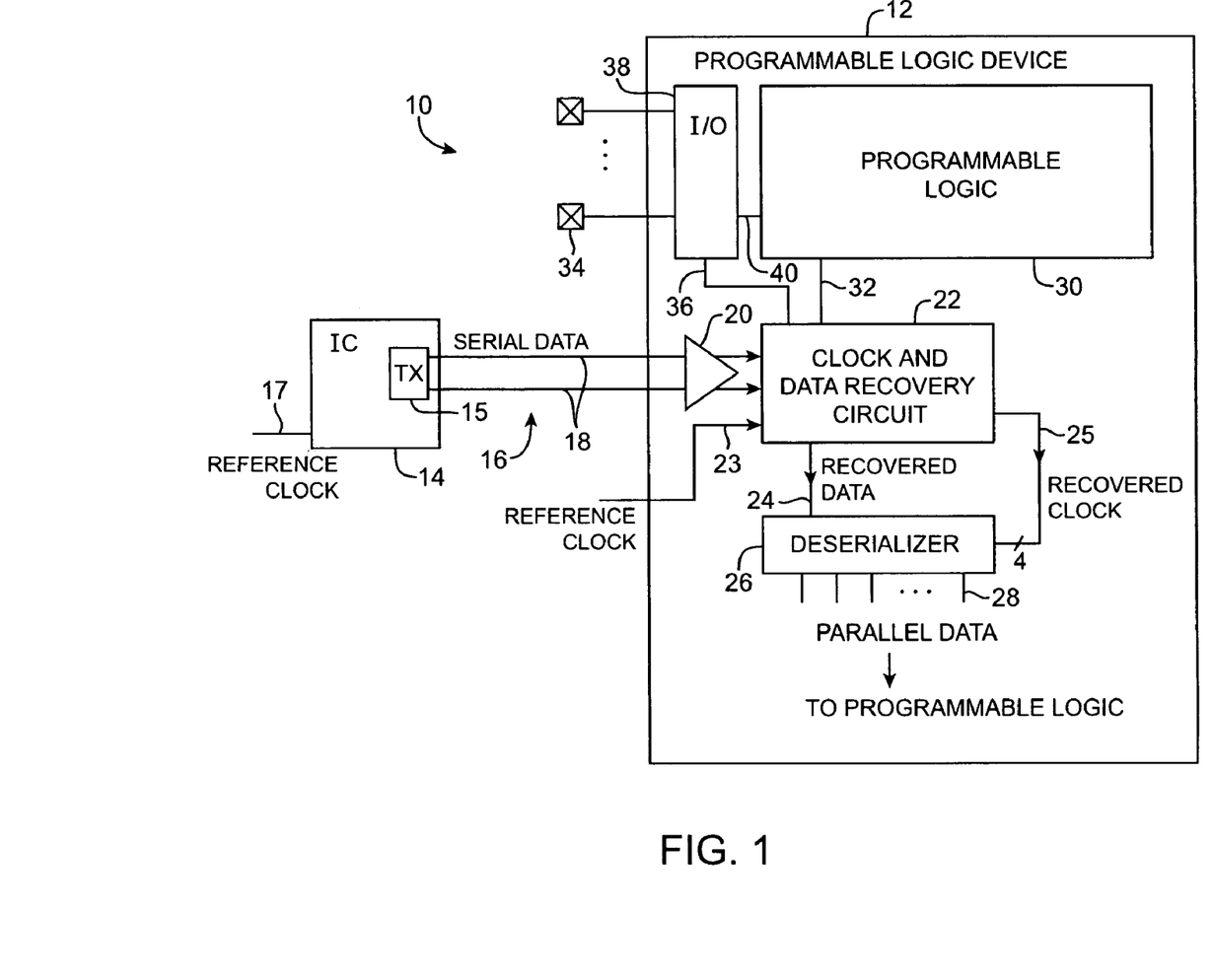
FIG. 1 is a diagram of an illustrative system in which a first integrated circuit communicates with a second integrated circuit such as a programmable logic device integrated circuit over a serial data communications link in accordance with the present invention.

An illustrative system 10 in accordance with the present invention is shown in FIG. 1. In the illustrative system of FIG. 1, a programmable logic device integrated circuit 12 is in communication with another integrated circuit 14 over a serial communications link 16. Integrated circuit 14 may be any suitable integrated circuit such as an application specific integrated circuit, a digital signal processor, a microcontroller or microprocessor, a communications chip, video or audio processing circuitry, etc.

Programmable logic devices such as programmable logic device 12 are integrated circuits in which a user can configure or program the circuit to perform a desired custom logic function. Programmable logic device 12 may include programmable elements that are used to configure internal logic resources. Programmable logic device 12 may also include memory that may be used to store instructions or data. With one suitable arrangement, programmable logic device 12 may include rows and columns of logic blocks interconnected by programmable horizontal and vertical interconnections. The logic blocks may contain macrocells with registers and other logic resources and may contain array logic. These are merely illustrative programmable logic device arrangements that may be used. Programmable logic devices 12 with any suitable architecture or feature set may be used in system 10 if desired.

The clock and data recovery circuitry of the present invention may be used in programmable logic device integrated circuits such as circuit 12 and integrated circuits other than programmable logic devices. For clarity, the invention will be described primarily in the context of programmable logic device integrated circuits.

Serial communications link 16 may be any suitable serial data link. For example, serial communications link 16 may be a high-speed differential data link in which differential data is conveyed over a pair of associated signal lines 18. Lines 18 may include conductive traces such as lines on one or more circuit boards, cables, system backplane busses, etc.

Integrated circuit 14 may have a transmitter 15. The transmitter 15 may serialize data from circuitry within integrated circuit 14 and may embed a clock in the signal. The transmitter 15 may transmit the data with the embedded clock to programmable logic device 12 over link 16.

The embedded clock signal may be generated from a known reference clock that is received at terminal 17. The reference clock may be generated by an oscillator on a board in system 10 on which both integrated circuit 14 and programmable logic device 12 are mounted or may be generated by an oscillator elsewhere in system 10.

The reference clock generally has a lower frequency than the high-speed data in the serial data stream. For example, the reference clock may have a frequency of 400 MHz and the digital data stream being conveyed from integrated circuit to device 12 may have a data rate of 3.2 Gbps (as an example).

The serial data may be encoded using any suitable format. For example, the data may be non-return-to-zero (NZR) data.

The programmable logic device 12 may receive the differential data signals from lines 18 using a differential input buffer 20. Input buffer 20 strengthens and level shifts the differential data. At the output of the input buffer 20, the differential data signals have the appropriate high and low logic levels for processing by the digital circuitry on device 12.

The output signals from input buffer 20 are received by a clock and data recovery circuit 22. Clock and data recovery circuit 22 also receives the reference clock at input 23.

The clock and data recovery circuit 22 may have a first phase-locked loop that locks onto the reference clock. Once the clock and data recovery circuit has acquired the reference clock, a second phase-locked loop in the clock and data recovery circuit may be used to extract the embedded clock. The recovered embedded clock may be used to recover the data from the data stream.

The clock and data recovery circuit 22 may pass the recovered data and recovered clock to a deserializer 26 over data path 24 and recovered clock path 25. The deserializer 26 may use the recovered clock to convert the recovered data into a parallel data format. The parallel data may be provided to other circuitry on programmable logic device 12 on parallel output lines 28. As an example, the parallel data may be provided to other circuitry using an 8-bit-wide or 16-bit-wide data bus formed from lines 28.

When the clock and data recovery circuit is locking onto the reference clock, the clock and data recovery circuit may be said to be in "reference" mode (also sometimes called "training" mode). In this mode, the clock and data recovery circuit is using the first phase-locked loop to lock onto the reference clock supplied at reference clock input 23. When the clock and data recovery circuit is using the second phase-locked loop to lock onto the embedded clock (i.e., by recovering this clock from the data), the clock and data recovery circuit may be said to be in "data mode."

The clock and data recovery circuit 22 may switch automatically between data mode and reference mode. For example, when certain conditions are met that are indicative of a positive lock by the reference-clock loop, the clock and data recovery circuit 22 can automatically switch from reference mode to data mode. When other conditions are satisfied (e.g., if the phase-locked loop used for recovering the data has lost its lock) the clock and data recovery circuit can automatically switch back into reference mode.

The automatic mode switching capabilities of clock and data recovery circuit 22 help the clock and data recovery circuit perform well under a variety of operating conditions. A system designer who is using programmable logic device 12 in system 10 can rely on automatic mode switching to provide reliable performance in recovering the data from link 16. With one suitable arrangement, the automatic mode switching capabilities of clock and data recovery circuit 22 are built into the programmable logic device circuitry, so that the system designer need not create any custom logic functions to obtain the benefits of automatic mode switching.

If desired, however, the automatic mode switching function can be overridden using special control signals. For example, override control signals from a process implemented in programmable logic 30 may be conveyed to clock and data recovery circuit 22 over a path such as path 32. Override control signals may also be conveyed to clock and data recovery circuit 22 from an external source such as one or more of input-output (I/O) pins 34. External control signals from pins 34 may be conveyed to clock and data recovery circuit 22 via input-output circuitry 38 and signal paths such as signal path 36. (Signals may also be passed between pins 34 and programmable logic 30, using I/O circuitry 38 and signal paths such as signal path 40.)

Figure 2:
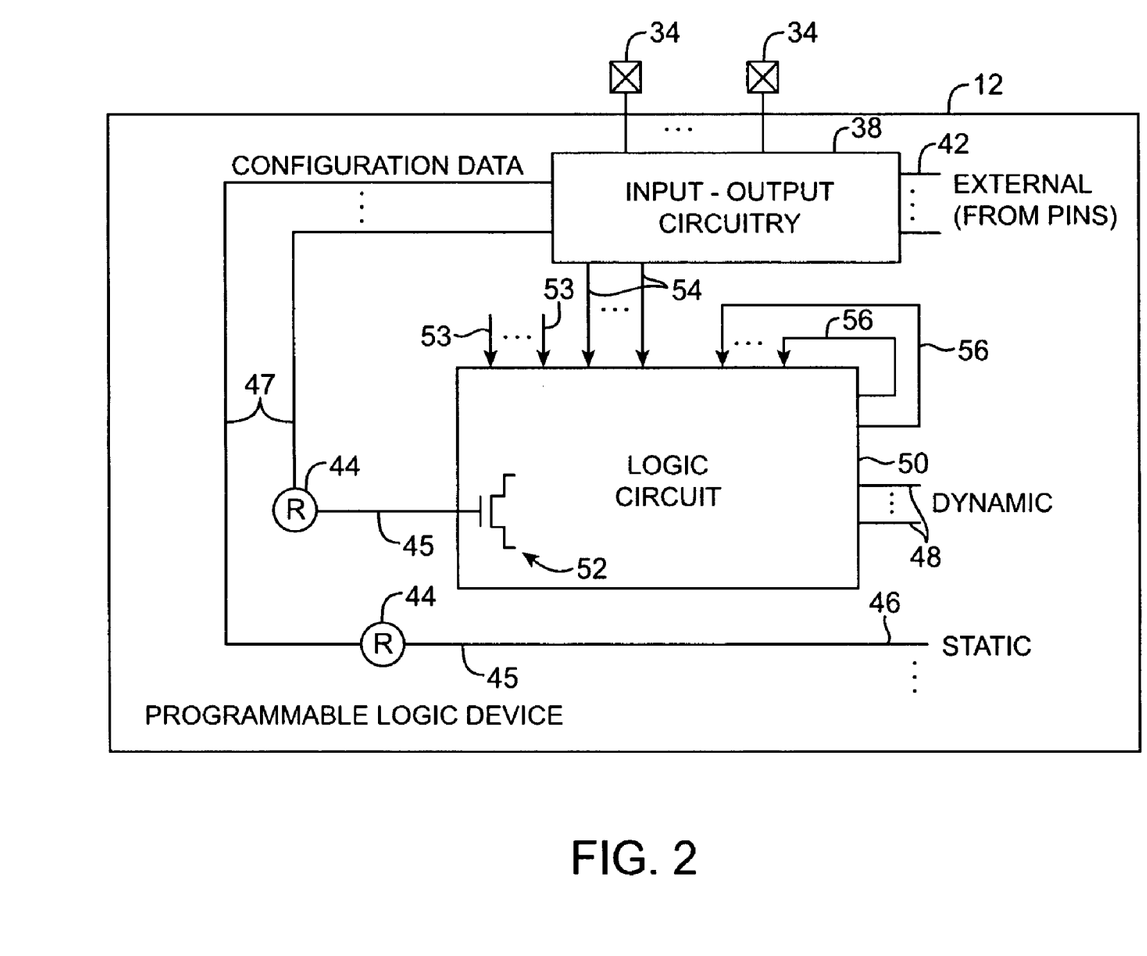
FIG. 2 is a diagram of an illustrative programmable logic device that may be used with a clock and data recovery circuit in accordance with the present invention.

The control signals and other signals in programmable logic device 12 may be characterized as either external signals or internal signals. As shown in FIG. 2, external signals may be received by the programmable logic device 12 from I/O pins 34 and may be presented at the outputs 42 of input-output circuitry 38 essentially unchanged. The clock and data recovery circuitry 22 may use the external signals on outputs 42 as override control signals. Other circuitry on programmable logic device 12 may use the external signals as control signals or data.

Internal signals may be characterized as "static" or "dynamic." Static signals may be produced directly at the output 45 of a programmable element 44. These signals are said to be static, because once device 12 has been programmed, the static signals do not change during operation of the device. Dynamic signals can vary during device operation. In the illustrative arrangement of FIG. 2, logic circuit 50 of device 12 produces dynamic signals at outputs 48.

The programmable logic of programmable logic device 12 may be based on any suitable programmable or configurable logic technology. For example, programmable logic device 12 may be customized using programmable elements (sometimes called "function control elements) that are formed from fuses, antifuses, random-access-memory (RAM) cells, read-only memory (ROM), erasable programmable read-only memory (EPROM), electrically-erasable programmable read-only memory (EEPROM), laser programmed links, etc. A user programs or configures the programmable logic elements on device 12 (using the appropriate technology) so that the programmable circuitry of the programmable logic device performs certain desired functions.

As shown in FIG. 2, programmable logic device 12 may have programmable elements 44 that are configured by loading them with configuration data provided via pins 34, input-output circuitry 38, and configuration data paths 47. Although the illustrative example of FIG. 2 uses programmable elements 44 such as RAM cells that are electrically programmed by loading them with appropriate configuration data, this is merely illustrative. Any suitable type of programmable logic integrated circuit may be used in system 10 if desired.

The configuration data (e.g., the logic ones and zeros that are loaded into the RAM cells or other elements 44) changes the states of these cells so that they output corresponding high or low logic signals at their outputs 45. When these signals are provided directly to an output line such as output line 46, they are said to be static signals, because they will not change unless or until the device is reprogrammed. Because programmable logic devices are normally never or only rarely reprogrammed, the static signals will not change during device operation.

The output signals from programmable element outputs 45 may be used to configure the circuitry on device 12 to perform a desired logic function. For example, the output signal from a programmable element may be applied to the gates of metal-oxide-semiconductor transistors in programmable logic circuit 50 such as transistor 52. In this way, the configuration data may be used to turn off certain parts of the logic circuit 50 while turning on other parts of the logic circuit 50, thereby customizing the functions of circuit 50.

Once customized, the logic circuit 50 may produce time varying (dynamic) signals at its outputs 48 during normal operation. These dynamic output signals can be depend on signals from other portions of device 12 (e.g., signals received at inputs 53 from other logic circuits). The dynamic output signals at outputs such as outputs 48 can also depend on external signals (e.g., signals received at inputs 54 from pins 34 via input-output circuitry 38). Some of the dynamic signals produced by logic circuit 50 may be fed back into circuit 50 (e.g., via direct or indirect feedback paths such as paths 56 in FIG. 2). These fed back signals may also influence which signals are produced at the outputs 48.

The clock and data recovery circuit 22 (FIG. 1) can be controlled by control signals from any of these sources. For example, the override signals that control whether or not the clock and data recovery circuit 22 is in automatic mode can be provided from an external source as external control signals. The override signals can also be provided from an internal source (i.e., as static control signals from a RAM cell or other programmable element or as dynamic control signals from a programmable logic circuit such as logic circuit 500 or from non-programmable dedicated logic).

The clock and data recovery circuit 22 may use any suitable architecture. With one approach, the clock and data recovery circuit has a two-loop arrangement in which two phase-locked loops are used to recover the embedded clock and data from the incoming data stream.

Figure 3:
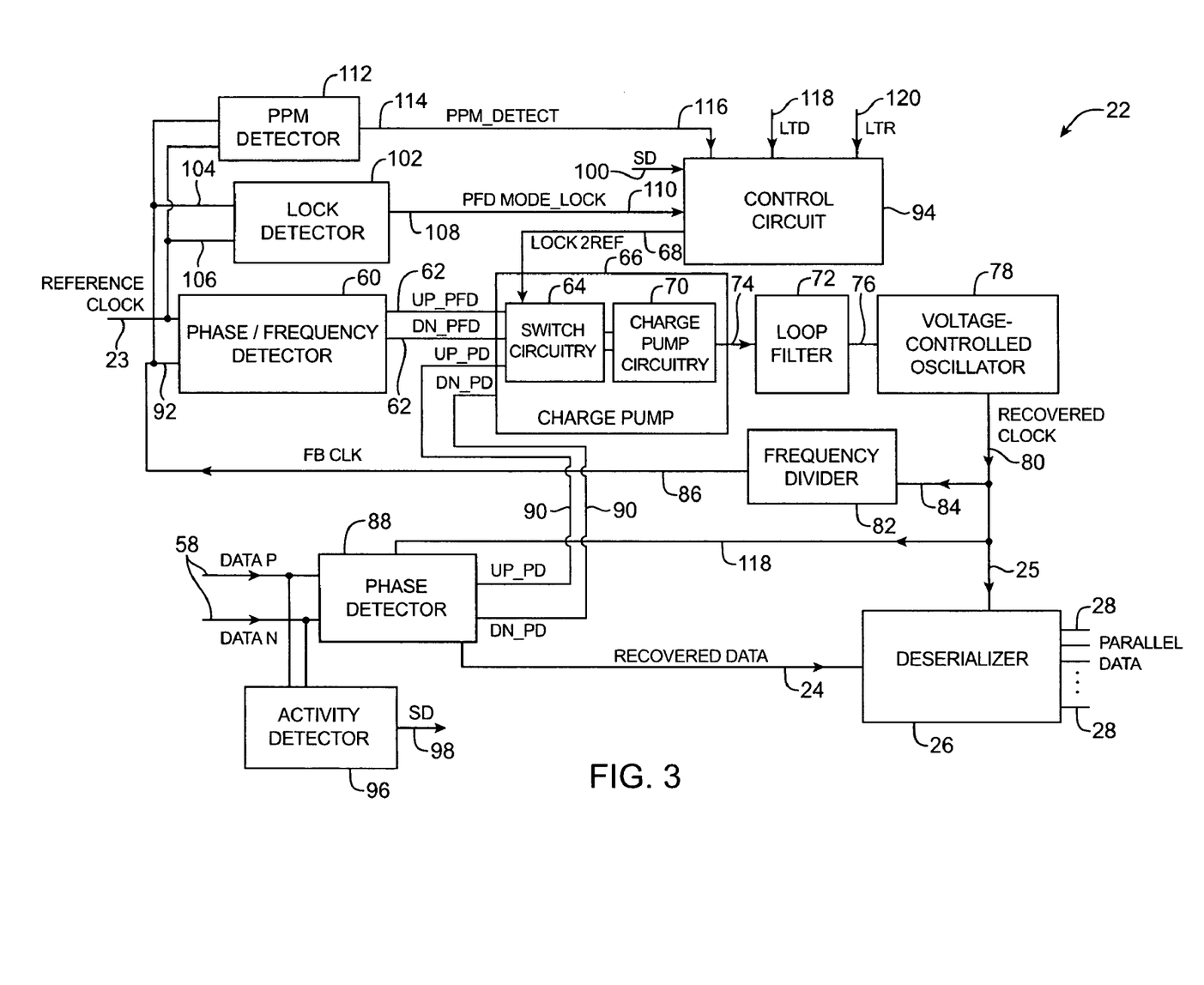
FIG. 3 is a diagram of an illustrative clock and data recovery circuit in accordance with the present invention.

An illustrative clock and data recovery circuit 22 based on a two-loop architecture is shown in FIG. 3. A first phase-locked loop, which is used during reference mode, is formed by phase/frequency detector 60, charge pump 66, loop filter 72, voltage controlled oscillator 78, and frequency divider 82. A second phase-locked loop, which is used during data mode, is formed by using phase detector 88 in place of phase/frequency detector 88.

Data from input buffer 20 (FIG. 1) may be provided to circuit 22 via input terminals 58 (labeled DATAP and DATAN for "positive" and "negative" differential data line inputs). Recovered data is provided to deserializer 26 via recovered data line 24. Deserializer 26 deserializes the recovered data (if deserialization is desired) and provides the recovered data in a parallel format to other circuitry on the programmable logic device.

Initially, following device power-up, the clock and data recovery circuit enters reference mode. Phase/frequency detector 60 compares the reference clock provided to reference clock input 23 to a feedback clock FBCLK from the voltage-controlled oscillator 78. The phase/frequency detector 60 provides to output signals: UP_PFD and DN_PFD on its outputs 62. When the reference clock is ahead of the FBCLK, the up control signal UP_PFD is taken high and the DN_PFD signal is taken low. When the reference clock is behind FBCLK, UP_PFD is low and DN_PFD is high. The phase/frequency detector outputs UP_PFD and DN_PFD therefore act as control signals for the rest of the phase-locked loop. These control signals are used to adjust the frequency of the feedback signal produced by the voltage-controlled oscillator so that it matches the reference clock.

The output signals UP_PFD and DN_PFD from the phase/frequency detector 60 are provided to switch circuitry 64 of charge pump 66. During reference mode, the control signal LOCK2REF on control circuit output line 68 is high, indicating that the first phase-locked loop is being used to lock onto the reference frequency. The high logic value for LOCK2REF directs switch circuitry 64 to connect the phase/frequency detector outputs 62 to charge pump circuitry 70, rather than connecting the outputs 90 of phase detector 88 to charge pump circuitry 70.

The charge pump 70 produces an analog output current that is proportional to the incoming control signals (i.e., the detector output signals) UP_PFD and DN_PFD. This current is provided to loop filter 72 over path 74. Loop filter 72 filters the output signal from charge pump 66 to remove undesirable frequency components. Loop filter 72 also converts the current-based signals on line 74 into corresponding voltage-based signals. The resulting filtered voltage signals are provided over line 76 to voltage-controlled oscillator 78. Voltage-controlled oscillator 78 produces an output signal whose frequency is proportional to the voltage on line 76. The output signal from the voltage-controlled oscillator 78 may be feed back to input 92 of the phase/frequency detector 60 via output 80, line 84, and FBCLK path 86.

An optional frequency divider 82 may be used in this feedback path if desired. As shown in FIG. 3, the frequency divider may be configured so that the frequency of the voltage-controlled oscillator output signal at output 80 matches the desired frequency of the recovered clock for deserializer 26, without any need for further downstream frequency multiplication. With one illustrative arrangement, the frequency divider 82 divides the frequency of the output signal on output 80 by a factor of 4. With this type of arrangement, a reference clock frequency of 400 MHz will result in an signal of 1.6 GHz at the output 80. This signal can be used as the recovered clock for a 1.6 Gbps data stream without further frequency doubling, etc. Use of a frequency divider that divides the frequency of the signal on output 80 by a factor of 4 is merely illustrative. Any suitable frequency ratio may be used between output 80 and input 92 if desired.

The clock and data recovery circuit 22 remains in reference mode until control circuit 94 determines that it is appropriate to change the operating mode of circuit 22 to data mode. Any suitable criteria may be used to determine when it is appropriate to shift from reference mode to data mode. With the illustrative arrangement of FIG. 3, several different detector criteria are used by control circuit 94.

First, the data signal must be active. Data activity is represented by data activity signal SD, which is received at control circuit input 100. Clock and data recovery circuit 22 may have an activity detector 96 that monitors differential data inputs 58. If there is no data present or if the activity level is too low, the activity detector produces a low activity signal SD at its output 98. If data is present, activity detector 96 generates a logical high signal SD at its output. (The labeling conventions used for the various data signals described herein—e.g., whether a particular signal is high or low—are merely illustrative. Any of these values can be reversed using inverter circuitry or different naming conventions if desired.)

Second, the first phase-locked loop must be locked onto the reference frequency. A lock detector such as lock detector 102 may be used to evaluate whether the phase-locked loop has locked to the reference frequency. Lock detector 102 receives the reference clock and the feedback clock FBCLK at its inputs 104 and 106, respectively. When the lock detector determines that FBCLK has locked onto the reference frequency, the lock detector 102 produces a high PFDMODE_LOCK signal on its output 108. The PFDMODE_LOCK signal is received at input 110 of control circuit 94 for evaluation.

Third, the reference frequency and feedback clock FBCLK must be close to each other. "closeness" may be defined as the number of "parts per million" (PPM) by which the frequency of the reference clock and feedback clock FBCLK differ. The maximum number of PPM in frequency by which the reference and feedback clock can differ and still be considered to be "locked" may be dictated by the signaling standard under which the communications link 16 is being operated. The signaling standard may, as an example, dictate that these values differ by no more than 200 ppm, 100 ppm, 50 ppm, etc. If the reference frequency and feedback clock FBCLK differ by less than the prescribed phase difference, PPM detector 112 produces a logic high signal at its output 114. The output from PPM detector 112, called PPM_DETECT, is received by control circuit 94 at input 116. PPM detector 112 focuses on frequency (as opposed to phase and frequency) and makes measurements over a relatively long period of time (e.g., 32,000 cycles at 400 MHz or 80 microseconds). Lock detector 102 is responsible for ensuring that both the phase and the frequency of the reference clock and feedback clock are sufficiently close, but lock detector 102 makes measurements over a relatively shorter period of time (e.g., a few microseconds).

As long as circuit 22 is in automatic mode, control circuit 94 evaluates the signals PPM_DETECT, PFDMODE_LOCK, and SD to determine whether or not control circuit 94 should automatically switch circuit 22 from reference mode into data mode.

If it is determined that the reference phase-locked loop has acquired the reference clock, the control circuit 94 takes the LOCK2REF signal on output 68 low. This directs switch circuitry 64 of charge pump 66 to connect the $UP_{13}$ PD and DN_PD output signals from output 90 of phase detector 88 to the inputs of charge pump circuitry 70 in place of the UP_PFD and DN_PFD outputs of the phase/frequency detector. As a result, the data-mode phase-locked loop is switched into use and the circuit 22 operates in data mode.

Once in data mode, the phase detector 88 compares phase information from the DATAP and DATAN signals to the output clock signal from the voltage controlled oscillator 78. The output clock signal may be conveyed from the voltage-controlled oscillator to the phase detector over path 118. The voltage-controlled oscillator may provide its output clock signals using any suitable arrangement (e.g., one-phase, two-phase, etc.). With one suitable arrangement, output 80 has four parallel signal paths each of which contains clock information that is shifted in phase with respect to the next (i.e., output 80 has a 0° phase signal line, a 90° line, and 180° and 270° lines). The feedback clock signal provided to frequency divider 82 over path 84 and the recovered clock that is provided to deserializer 26 may use the same type of four-phase clock arrangement if desired.

Regardless of the particular format used for the output of voltage-controlled oscillator 78, the phase information in this output is preferably compared to the phase information of the DATAP and DATAN data signals by phase detector 88 and the resulting error signals UP_PD and DN_PD are provided to charge pump 66 via output lines 90. When the phase of the data signal leads that of the feedback clock, the UP_PD signal is taken high, while DN_PD is held low. When the phase of the data signal lags that of the feedback clock, DN_PD is set high and UP_PD is set low. Because the LOCK2REF signal on line 68 is low during data mode, these phase error signals are coupled into the phase-locked loop and are used to correct the phase of the feedback clock signal produced by the voltage-controlled oscillator 78 at output 80. As a result, the feedback clock at the output 80 locks onto the data.

Once circuit 22 has locked onto the data, the clock signal at the output of voltage-controlled oscillator 78 can be taken as the recovered version of the clock signal that was originally embedded into the data signal at the transmitter 15 (FIG. 1). The recovered clock, which is provided to phase detector 88 via line 118, is used by phase detector 88 to recover a stream of digital data from the differential DATAP and DATAN terminals. The recovered data may be provided to deserializer 26 over path 24.

Operation of clock and data recovery circuit 22 will remain in data mode unless the locked condition is lost. Control circuit 94 may use any suitable criteria to determine whether the circuit 22 is locked onto the data. With one suitable approach, the control circuit will consider the loop to no longer be locked if the data activity signal SD or the phase-matching signal PPM_DETECT goes low. The state of the phase/frequency lock signal PFDMODE_LOCK is not considered with this approach, because immediately after entering data mode, the PFDMODE_LOCK signal tends to temporarily go low (because it is comparing the feedback clock to the embedded data clock for the first time, rather than comparing the feedback clock to the reference clock). This transitional change in PFDMODE_LOCK is not indicative of an overall loss of frequency clock, but rather results from the momentary process of switching between loops. To avoid false switching based on the temporary change in the PFDMODE_LOCK signal, the state of the PPM_DETECT signal is used to control the transition from data mode back to reference mode, rather than the PFD-MODE_LOCK signal.

If the control circuit 94 determines that the clock and data recovery circuit 22 is no longer locked to the data, the control circuit will automatically return the circuit 22 to reference mode by changing the value of LOCK2REF to high. Once back in reference mode, the circuit 22 can again try to obtain frequency lock to the reference clock.

Automatic operation may continue in this way indefinitely. When clock and data recovery circuit 22 locks to the reference frequency, the control circuit 94 will automatically place the circuit into data mode. If the locked condition is lost, the control circuit 94 will automatically place the circuit into reference mode. The toggling between reference mode and data mode occurs without any user intervention (i.e., without consideration to which static and/or dynamic control signals the system designer's programmed logic is producing). This mode of operation may therefore be referred to as "automatic" mode.

The automatic mode of operation may be overridden using override control signals. For example, static override signals may be provided at the outputs 46 of programmable elements 44 or dynamic override signals may be provided at the outputs 48 of a logic circuit 50, as shown in FIG. 2. External signals on lines 42 (e.g., signals received from off-chip sources in system 10 via input/output pins 34) may also be used as override control signals.

The override control signals can be used to direct control circuit 94 to place circuit 22 in a particular desired mode of operation. Any suitable arrangement may be used to override operation in automatic mode. With one suitable approach, one combination of override control signals may be used to force circuit 22 into reference mode, whereas another combination of override control signals may be used to force circuit 22 into data mode. When circuit 22 is forced into reference mode or data mode, automatic operation ceases, and circuit 22 will remain in the mode into which it was forced until the override signals are removed (changed).

As shown in FIG. 3, the override signals may be provided in the form of LTD (lock-to-data) and LTR (lock-to-reference) signals. The LTD signal may be received by control circuit 94 at input 118. The LTR signal may be received by control circuit 94 at input 120.

When LTD is asserted, circuit 94 places circuit 22 into data mode. When the LTR signal is asserted, circuit 94 places circuit 22 into reference mode. To avoid uncertainty when both LTR and LTD are asserted simultaneously, control circuit 94 may place clock and data recovery circuit into data mode when both LTR and LTD are high. This is merely one illustrative way to resolve this potential conflict. For example, the circuit 94 could alternatively not change the state of the circuit 22 when both LTR and LTD are asserted, thereby leaving the circuit 22 in the first non-automatic state into which it was forced.

Figure 4:
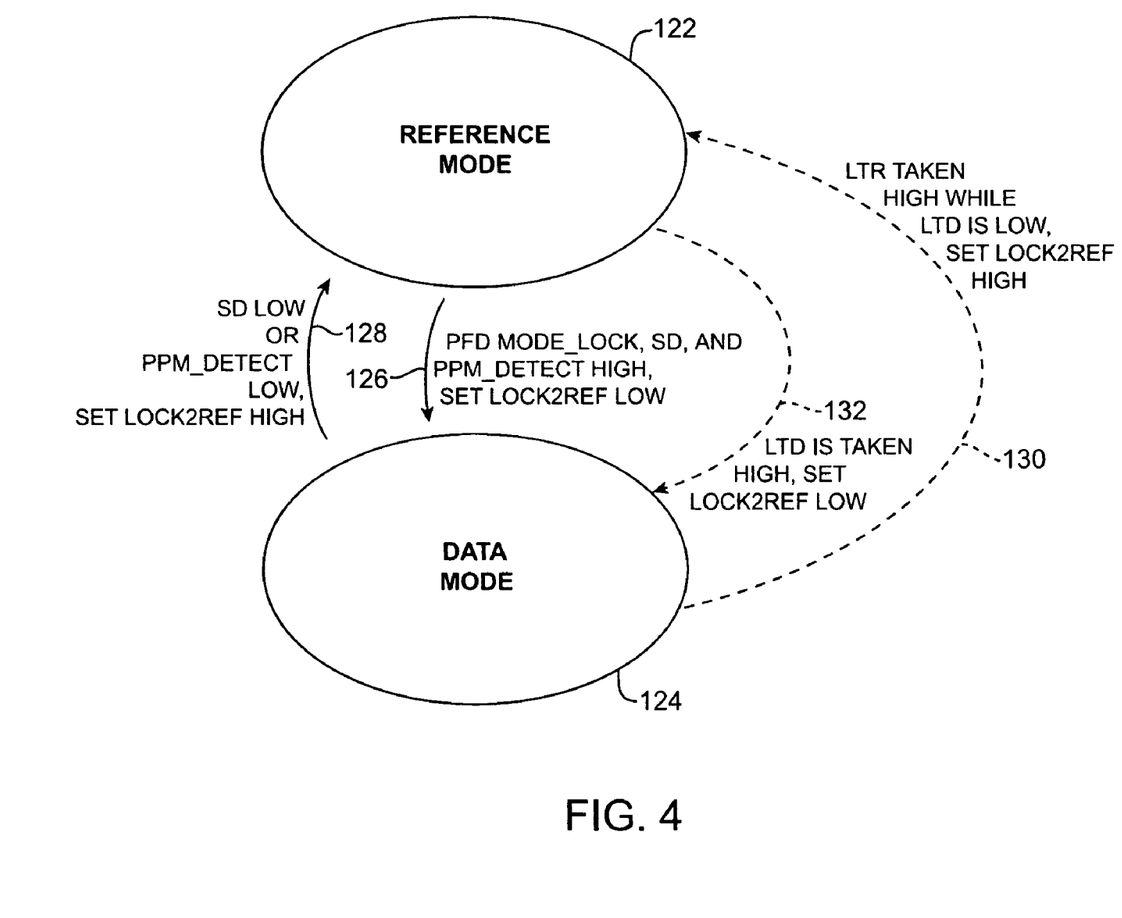
FIG. 4 is a state diagram showing how the clock and data recovery circuit of FIG. 3 operates in accordance with the present invention.

A state diagram illustrating the behavior of the clock and data recovery circuit 22 in its automatic mode of operation and during override operations is shown in FIG. 4. Upon power-up of an integrated circuit such as a programmable logic device containing the clock and data recovery circuit 22, the clock and data recovery circuit may be placed in reference mode 122. If the LTR and LTD signals are both low, the circuit 22 will be in an automatic mode of operation whereby the circuit 22 automatically toggles between reference mode 122 and data mode 124.

During reference mode, the clock and data recovery circuit 22 attempts to capture the reference clock using the first phase-locked loop. Once the reference clock has been acquired, the clock and data recovery circuit 22 automatically enters data mode 124, as shown by line 126.

The control circuit 94 (FIG. 3) automatically places the clock and data recovery circuit 22 into data mode by taking the LOCK2REF signal low. This changes the state of switch circuitry 64, so that the input of charge pump 66 is connected to the phase detector 88 (to form the second phase-locked loop), rather than being connected to phase/frequency detector 60 (to form the first phase-locked loop). No user-implemented processes need be used to change the state of control circuit 22 from reference mode to data mode when clock and data recovery circuit 22 is operating in automatic mode.

As shown by line 126 in FIG. 4, the control circuit 94 sets LOCK2REF low and enters data mode 124 when PFDMODE_LOCK, SD, and PPM_DETECT all go high. About 32,000 bits may need to be compared (as an example) to decide whether the PPM_DETECT signal should be taken high, so the PPM_DETECT signal is generally the last of these signals to go high. If any one of these signals is not high (with this illustrative control arrangement), the control circuit 94 will not take LOCK2REF low, and the clock and data recovery circuit 22 will remain in reference mode 122.

The clock and data recovery circuit 22 will remain in data mode unless the control circuit 94 detects that either the SD signal or the PPM_DETECT signal has become low. The SD signal is indicative of data signal activity. The PPM_DETECT signal is indicative of a high-quality frequency match with the data signal. If the SD signal or the PPM_DETECT signal goes low, the data signal is probably weak or corrupted and there is a chance that the clock has drifted onto a harmonic or has otherwise been lost. Accordingly, if either SD or PPM_DETECT goes low, the control circuit 94 automatically places the clock and data recovery circuit 22 back into reference mode 122, as indicated by line 128. The ability of control circuit 94 to automatically shift the clock and data recovery circuit 22 from reference mode to data mode allows the circuit 22 to handle potentially noisy or corrupt data signals without becoming locked on a false clock (i.e., a harmonic).

If desired, the clock and data recovery circuit 22 can be forced into either reference mode or data mode. To force the clock and data recovery circuit 22 into reference mode 122, the LTR signal may be taken high using any of the control signal sources described in connection with FIG. 2 (e.g., external sources providing signals on lines 42, dynamic sources producing signals on lines 48, or static sources providing signals on lines 46). Setting LTR high will direct the control circuit 94 to exit automatic mode and to place clock and data recovery circuit 22 into reference mode 122, as shown by dotted line 130.

To force the clock and data recovery circuit 22 into data mode 124, the LTD signal may be taken high using a suitable control signal source (e.g., one of the control signal sources of FIG. 2). When LTD is taken high, the control circuit 94 exits automatic mode and places clock and data recovery circuit 22 into data mode 124, as shown by dotted line 132. Simultaneous assertion of both LTD and LTR could lead to a contention situation, because clock and data recovery circuit 22 cannot be in both reference mode 122 and data mode 124 at the same time. One suitable way to resolve this potential contention issue is to only allow the circuit 22 to enter reference mode (via line 130) if the LTD signal is low. This is merely one illustrative way to avoid contention issues in circuit 22. Any other suitable arrangement for avoiding contention between the LTR and LTD signals may be used if desired.

Moreover, other comparable override signal formats can be used in place of the LTD and LTR signal format if desired. As just one example, an "EXIT_AUTO" signal could be used to turn on or off the automatic mode and a LTR/LTD select signal could be used to select whether circuit 22 is to be forced into data mode or reference mode. With this alternative control signaling scheme, setting EXIT_AUTO high and setting LTR/LTD low places the circuit 22 in reference mode and setting EXIT_AUTO high and setting LTR/LTD high places the circuit in data mode. If EXIT_AUTO is low, the circuit remains in auto mode regardless of the state of LTR/LTD.

Still other signaling schemes may be used that have more signal lines (e.g., three signal lines) or that use serially-loaded control signals that are provided to the control circuit over a single control line. The control lines for LTR and LTD (or their equivalent override signals) may be shared with other control and/or data signals if desired.

With these various control schemes, control circuit 94 may be implemented in hard-coded logic, using software instructions, using both soft instructions and hard logic together, or using any other suitable arrangement.

A suitable arrangement for control logic 94 may be based on hard-wired or programmable logic gates. This type of circuit arrangement is shown in FIG. 5.

Figure 5:
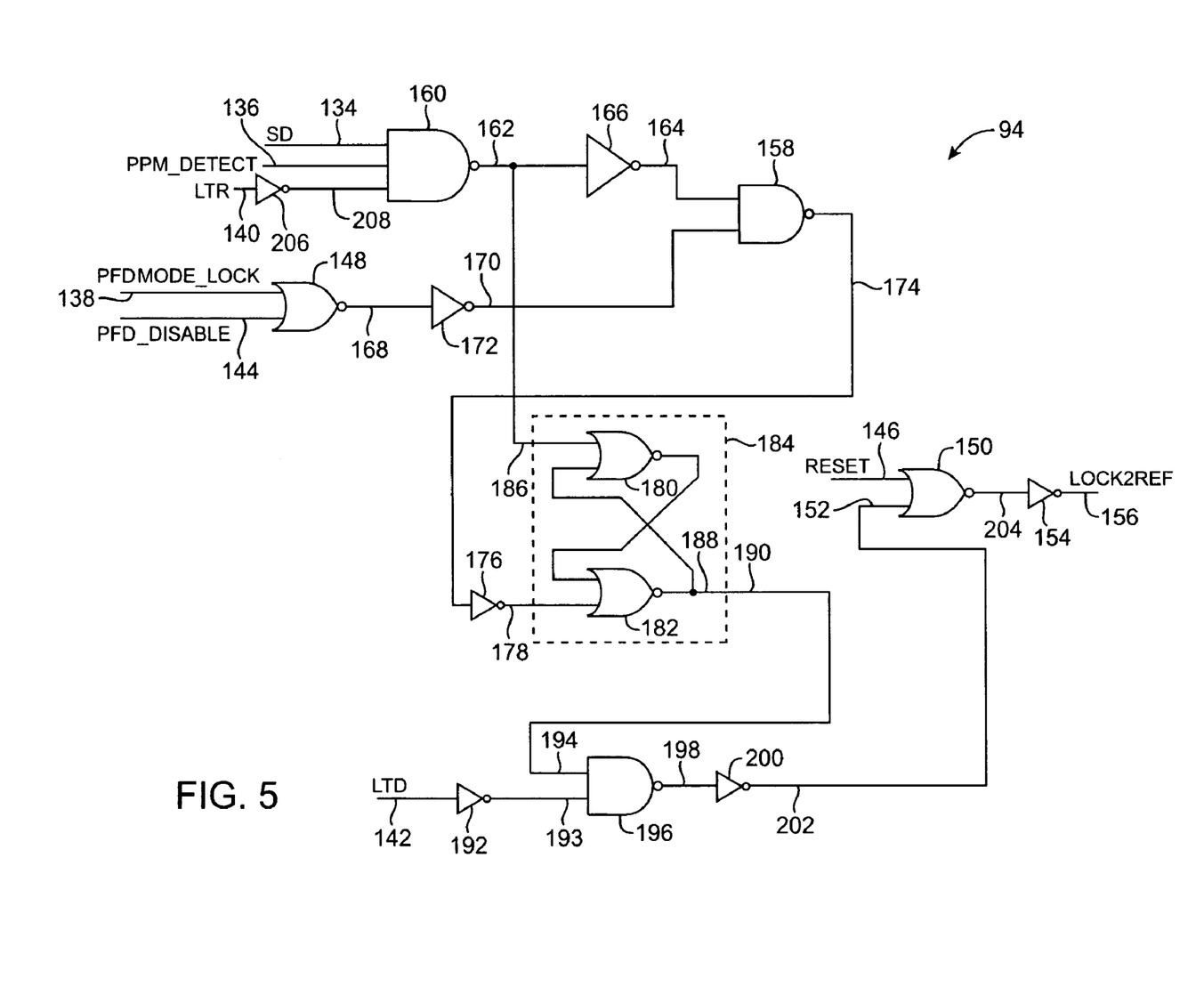
FIG. 5 is a circuit diagram of illustrative control logic for a clock and data recovery circuit in accordance with the present invention.

As shown in FIG. 5, control circuit 94 may receive the SD signal at input 134. The PPM_DETECT signal may be received at input 136. Input 138 may be used for the PFDMODE_LOCK signal. Control circuit 94 may receive the LTR signal at input 140 and the LTD signal at input 142.

Control circuit 94 may have optional disable and reset functions. For example, PFD_DISABLE may be taken high at input 144 to disable the PFDMODE_LOCK signal. If PFD_DISABLE is high, the output of NOR gate 148 will be low, regardless of the state of PFDMODE_LOCK at input 138, thereby disabling this control signal. If the RESET signal on input 146 is taken high, the output 204 of NOR gate 150 will be low, regardless of the state of input 152. The RESET signal 146 may be asserted when it is desired to reset circuit 94 and other circuitry on the integrated circuit. In normal operation, RESET and PFD_DISABLE are held low. With RESET low, the signal on input 152 is provided at output 204 in inverted form (i.e., NOR gate 150 acts as an inverter).

If the LTR and LTD signals are low (i.e., the circuit 22 is in automatic mode), the output of NAND gate 158 will depend on the states of SD, PPM_DETECT, and PFD_DISABLE. If SD, PPM_DETECT, and PFDMODE_LOCK are all high, the inputs to NAND gate 160 will all be high and NAND gate output 162 will be low. As a result, the output 164 of inverter 166 will be high. The high state of PFDMODE_LOCK on input 138 will make the output 168 of NOR gate 148 low, so that the output 170 of inverter 172 will be high. With lines 164 and 170 both high, the output 174 of NAND gate 158 will be low. Inverter 176 inverts the state of output 174, so that line 178 is high.

Cross-coupled NOR gates 180 and 182 form a latch circuit 184. The low signal from output 162 is applied to input 186 of latch 184 while the high on line 178 forms another input to latch 184. These two inputs serve to set the latch 184 to a state where node 188 and output 190 are low.

Inverter 192 inverts the low LTD signal to produce a high signal at input 193 of NAND gate 196. Because output 190 is low, input 194 of NAND gate 196 is low. With input 194 low and input 193 high, the output 198 of NAND gate 196 is high. This high signal is inverted by inverter 200 to produce a low signal at output 202. The low signal on output 202 is provided to input 152 of NOR gate 150. Because the RESET signal on input 146 is low and the signal on input 152 is low, the output of NOR gate 150 on line 204 is high. The high signal on line 204 is inverted by inverter 154 to produce a low value of LOCK2REF at output 156 of control circuit 94. Thus, when LTR and LTD are low (i.e., when the circuit 22 is not being forced into either the reference mode or the data mode), the LOCK2REF signal will be set low (i.e., the circuit 22 will be placed in data mode) whenever SD, PPM_DETECT, and PFDMODE_LOCK are all high.

If either SD or PPM_DETECT goes low, output 162 of NAND gate 160 will go high, inverter output 164 will go low and output 174 of NAND gate 158 will go high. This high signal will be inverted by inverter 176 to provide a low signal at input 178 of latch 184. With output 162 high and input 178 low, latch 184 will produce a high at output 190. The high output 190 is provided to NAND gate 196 at input 194. With a high input 194 and a high input at 193, the output 198 of NAND gate 196 is low. Inverter 200 inverts the low signal on line 198 to produce a high signal at output 202. This high signal is inverted twice—once by NOR gate 150 and once by inverter 154, so that the LOCK2REF output signal at output 156 is high. When LOCK2REF is high, the circuit 22 switches into reference mode.

If PFDMODE_LOCK goes low at input 138, the output 168 of NOR gate 148 will go high. This high signal will be inverted by inverter 172 to produce a low signal at output 170. The low signal at output 170 is provided as an input to NAND gate 158 and forces output 174 high. The high output 174 is inverted by inverter 176 so that latch input 178 is taken low. However, because input 186 remains low, latch output 190 remains low (i.e., the latch maintains its previous value) and LOCK2REF remains low.

Thus, if SD or PPM_DETECT is taken low, control circuit 94 will automatically switch to reference mode and will supply a high LOCK2REF signal to direct the charge pump 66 of FIG. 3 to switch the first phase-locked loop into use in clock and data recovery circuit 22. If only PFDMODE_LOCK goes low, the circuit will remain in data mode.

Regardless of whether the circuit 22 is in data mode or reference mode, taking LTR high while LTD is low will cause control circuit 94 to produce a high LOCK2REF signal at output 156. Asserting LTR therefore forces the clock and data recovery circuit 22 (FIG. 3) to exit automatic mode and to enter reference mode, independent of the states of the SD, PPM_DETECT and PFDMODE_LOCK inputs that are normally used by the control circuit 94 (in automatic mode) to determine whether to operate in reference or data mode.

When LTR is taken high at input 140, inverter 206 produces a low signal on line 208. This forces output 162 of NAND gate and latch input 186 high. Inverter 166 inverts the high signal on output 162 to produce a low signal on output 164. The low signal on output 164 takes output 174 of NAND gate 158 high. This signal is inverted by inverter 176, so that input 178 of latch 184 is low. With input 178 low and input 186 high, latch output 190 is set high. If LTD is low, input 193 of NAND gate 196 will be high. With both input 194 high and input 193 high, the output 198 of NAND gate 196 is low. Inverter 200 inverts this low signal to produce a high on output 202. A corresponding high LOCK2REF signal is produced at output 156, so that circuit 22 exits automatic mode and is forced into reference mode.

If LTD is not low when LTR is taken high, the output of NAND gate 196 will be high and LOCK2REF will stay low (i.e., the circuit will remain in data mode, rather than being forced into reference mode if LTD is not low when LTR is asserted).

Regardless of the state of SD, PPM_DETECT, PFDMODE_LOCK, and LTR, if LTD is taken high, the inverted signal on line 193 will be low. This will force output 198 of NAND gate 196 high. Inverter 200 will invert the high signal on line 198 to produce a low output on line 202. The corresponding LOCK2REF signal on output 156 will therefore also be low. Whenever LTD is taken high, the LOCK2REF output signal of control circuit 94 will therefore be low and clock and data recovery circuit 22 (FIG. 3) will be forced into data mode.

The LTR and LTD signals (or other such override signals) may be supplied from an external source (e.g., from another chip in system 10), from the output of a configured RAM cell or other programmable element, or from dynamic circuitry on the integrated circuit (e.g., as a dynamic internal signal). Dynamic internal signals may be provided by hard-wired logic, by programmed logic, by processing circuitry that is executing instructions from memory, or by any other suitable circuitry or suitable combinations of these arrangements. When the control circuit 94 is used on a programmable logic device integrated circuit, the programmable and hard-wired resources of the programmable logic device integrated circuit may be used to implement one or more processes that produce the LTR and LTD signals. By using a programmable logic device such as programmable logic device 12 to implement a user's process, a user of a programmable device can customize the device's clock and data recovery control functions to suit certain particular needs, rather than relying solely on the clock and data recovery functionality originally provided with the integrated circuit.

Figure 6:
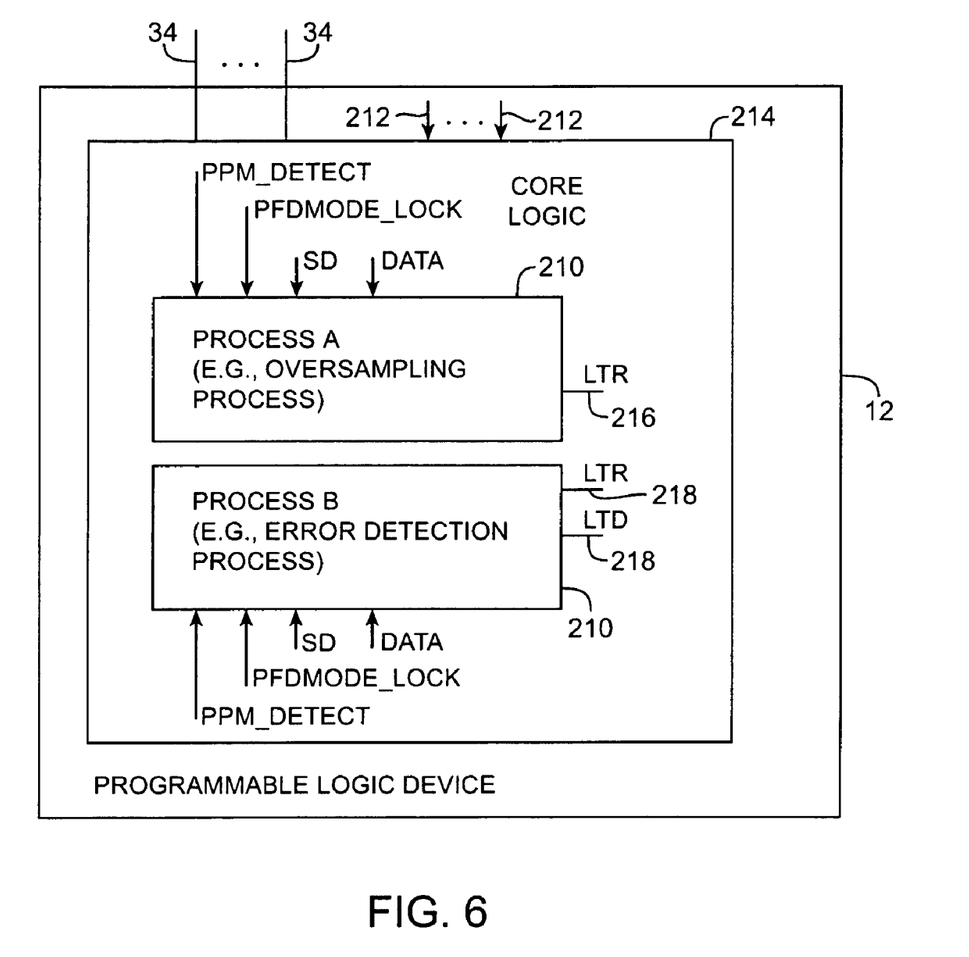
FIG. 6 is a diagram of illustrative processes that may be implemented on an integrated circuit such as a programmable logic device and that can be used to control a clock and data recovery circuit in accordance with the present invention.

An illustrative programmable logic device integrated circuit 12 in which two illustrative processes 210 have been implemented is shown in FIG. 6. These processes (labeled A and B in FIG. 6) may be any suitable processes that generate override signals such as LTR and LTD.

The processes may be implemented in core logic 214 of programmable logic device 12 (e.g., by configuring the programmable elements of core logic 214 with configuration data). Core logic 214 (and processes 210) may receive inputs from external sources (via pins 34) or from static or dynamic signal sources elsewhere on programmable logic device 12 (via inputs 212). The processes may use input signals such as the PPM_DETECT, PFDMODE_LOCK, and SD signals from circuit 22 of FIG. 3, and local and external data signals (DATA), as shown in FIG. 6. Processes 210 may use these input signals to generate override signals at outputs such as outputs 216 and 218.

An illustrative process that may generate a high LTR signal is an oversampling process. Circuits with high-speed differential signaling communications circuitry such as the clock and data recovery circuitry of FIG. 3 are generally designed to operate within a prescribed frequency range (e.g., 400 MHz to 3.2 GHz). Input signals that have higher frequencies will not be handled properly, because the circuitry is generally incapable of responding quickly enough (e.g., due to parasitic capacitances and transistors that are too slow). Input signals that are slower than the lowest allowed input frequency could be handled by the transistors of the circuit, but are not readily accepted by the logic of the circuit (e.g., there is no proper circuitry for dividing down the reference clock or taking other suitable steps for handling such low-speed signals).

Despite the lack of specific communications circuitry in the clock and data recovery circuit or other communications circuitry of the integrated circuit for handling low-speed data streams, it may be desirable to receive a particular low-speed input data stream (at least for a particular desired circuit application). A system designer may, as an example, have a particular application in mind that requires one or two such low-speed data streams, even if the capacity to handle such low-speed data streams is not hardwired into circuit 12.

One way to handle low-speed input data streams is to use an oversampling process (i.e., process A in this example). The oversampling process may sample the low-speed incoming data many times per low-speed clock cycle. The oversampling process may then reconstruct the incoming low-speed data stream from these samples. As an example, consider an input data stream of 100 Mbps in a system that has a 400 MHz reference clock. If the lowest bit rate that circuit 22 is designed to handle is 400 MHz, it will not be possible to recover the 100 Mbps data stream and provide that data to deserializer 26 as recovered data on line 24. If the circuit 22 were to enter data mode, the circuit would be susceptible to undesirable false locking onto data clock harmonics.

As a result, the oversampling process can produce a constant high LTR override signal at its output 216. The high LTR override signal forces the clock and data recovery circuit 22 to lock to the 400 MHz reference clock. If the frequency divider is set (for example) to 4, the recovered clock will have a frequency of 1.6 GHz. This 1.6 GHz feedback clock may be used to perform 16× oversampling on the incoming 100 Mbps data stream. The samples that are taken at the 1.6 GHz clock rate may be provided to the deserializer 26 over line 24. The samples (which are still raw data and not a recovered data stream at this point) may be passed to process A (e.g., via inputs 212). The oversampling process may then reconstruct the 100 Mbps data stream from the raw 1.6 GHz samples of the incoming signals. This approach allows the circuit 12 to handle incoming data signals, even if those data signals have a data rate that is not within the normal operating range of the clock and data recovery circuit.

An oversampling process is just one illustrative example of the type of circuit that may be used to produce an override signals such as a high LTR signal that forces the clock and data recovery circuit into reference mode. Any other suitable process that places circuit 22 into reference mode may be used if desired.

An illustrative process that places clock and data recovery circuit 22 into data mode is an error detection process. As shown in FIG. 6, an error detection process may produce an LTD signal and an LTR signal at its outputs 218. When process B produces a high LTD signal, circuit 22 is forced into data mode. When process B produces a low LTD signal, the control circuit 94 can operate in automatic mode (unless overridden by another process producing an overriding signal). The override signal LTR may be used by the process to force the control circuitry 94 into reference mode.

The error detection process may (in this example) implement a cyclic redundancy check (CRC) error detection algorithm. If the CRC error checking algorithm detects that the received data does not contain any errors and if PFD-MODE_LOCK is high (indicating that the circuit 22 has acquired the reference clock), the error detection process can place the circuit 22 in data mode by taking LTD high. The error detection process may place circuit 22 in data mode without waiting for PPM_DETECT to go high (as would be required before entering data mode when operating circuit 22 in automatic mode).

Although proceeding to data mode without waiting for PPM_DETECT to go high may not be as safe as waiting until the PPM detector 112 has produced a high output on output line 114, for many applications it may be preferable to react more quickly than is possible when waiting for the PPM detector. This is particularly true when the PPM detector requires a high degree of frequency matching between the feedback clock and the data signal phase.

It may take 10s or 100s of microseconds (as an example) before the PPM detector 112 is able to confirm that the appropriate frequency matching condition has been achieved. In some situations it may be preferable to wait until this confirmation process has been completed before switching into data mode. However, in some applications it may be preferable to move immediately into data mode, so that the second phase-locked loop can be immediately used to lock onto the data.

The error detection process may also be used to assert the LTR signal. For example, the early detection capabilities of the error detection process (process B) may detect an error before the PPM detector reflects any errors. Accordingly, the process may take LTR high at its output 218 to force control circuit 94 into reference mode, rather than waiting to accumulate enough information to make a PPM decision.

By implementing processes such as process B, the system designer can decide whether or not to transition between reference mode and data mode under the guidance of control circuitry 94 in automatic mode (by setting LTR and LTD to a low state) or whether to use a process output to force circuit 22 into data mode.

The foregoing is merely illustrative of the principles of this invention and various modifications can be made by those skilled in the art without departing from the scope and spirit of the invention.

What is claimed is:

1. A clock and data recovery circuit that recovers digital data and an embedded clock from an incoming serial data stream, the clock and data recovery circuit comprising:
   a reference clock input;
   a recovered clock output;
   a first phase-locked loop that receives a reference clock from the reference clock input, that locks onto the reference clock when the clock and data recovery circuit is operated in a reference mode, and that provides a corresponding reference clock signal directly to the recovered clock output when the clock and data recovery circuit is operated in the reference mode;
   a serial data stream input that receives the serial data stream;
   a second phase-locked loop that receives the serial data stream from the serial data stream input, that locks onto the incoming serial data stream when the clock and data recovery circuit is operated in a data mode, and that provides a corresponding recovered clock signal directly to the recovered clock output when the clock and data recovery circuit is operated in the data mode; and
   a control circuit that automatically switches the clock and data recovery circuit between the reference mode and the data mode.

2. The clock and data recovery circuit defined in claim 1 wherein the control circuitry is responsive to an override signal that forces the clock and data recovery circuit out of the automatic mode and into the reference mode.

3. The clock and data recovery circuit defined in claim 1 wherein the control circuitry is responsive to an override signal that forces the clock and data recovery circuit out of the automatic mode and into the data mode.

4. The clock and data recovery circuit defined in claim 1 further comprising:
   a charge pump having switch circuitry, wherein the control circuit switches the switch circuitry to use the charge pump in the first phase-locked loop or the second phase-locked loop depending on whether the clock and data recovery circuit is in the reference mode or the data mode.

5. The clock and data recovery circuit defined in claim 1 further comprising switch circuitry, wherein the control circuit includes circuitry responsive to a lock-to-data override signal and wherein when the lock-to-data override signal is asserted, the control circuitry directs the switch circuitry to switch the second phase-locked loop into use.

6. The clock and data recovery circuit defined in claim 1 further comprising switch circuitry, wherein the control circuit includes circuitry responsive to a lock-to-reference override signal and wherein when the lock-to-reference override signals is asserted, the control circuitry directs the switch circuitry to switch the first phase-locked loop into use.

7. A programmable logic device integrated circuit clock and data recovery circuit that recovers digital data and an embedded clock from an incoming serial data stream, the clock and data recovery circuit comprising:

a first phase-locked loop that locks onto a reference clock when the clock and data recovery circuit is operated in a reference mode;

a second phase-locked loop that locks onto the incoming serial data stream when the clock and data recovery circuit is operated in a data mode; and a control circuit that automatically switches the clock and data recovery circuit between the reference mode and the data mode, wherein the control circuit is controlled by a static override signal from a programmable element that has been configured using configuration data and wherein the static override signal is asserted to place the clock and data recovery circuit in the reference mode or is asserted to place the clock and data recovery circuit in the data mode.

8. A programmable logic device integrated circuit clock and data recovery circuit that recovers digital data and an embedded clock from an incoming serial data stream, the clock and data recovery circuit comprising:

a first phase-locked loop that locks onto a reference clock when the clock and data recovery circuit is operated in a reference mode;

a second phase-locked loop that locks onto the incoming serial data stream when the clock and data recovery circuit is operated in a data mode; and a control circuit that automatically switches the clock and data recovery circuit between the reference mode and the data mode, wherein the control circuit is controlled by a dynamic override signal from programmable logic device core logic on a programmable logic device and wherein the dynamic override signal is asserted to place the clock and data recovery circuit in the reference mode or is asserted to place the clock and data recovery circuit in the data mode.

9. A programmable logic device integrated circuit clock and data recovery circuit that recovers digital data and an embedded clock from an incoming serial data stream, the clock and data recovery circuit comprising:

a first phase-locked loop that locks onto a reference clock when the clock and data recovery circuit is operated in a reference mode;

a second phase-locked loop that locks onto the incoming serial data stream when the clock and data recovery circuit is operated in a data mode; and a control circuit that automatically switches the clock and data recovery circuit between the reference mode and the data mode, wherein the control circuit is responsive to an external override signal from a programmable logic device input pin and wherein the external override signal is asserted to place the clock and data recovery circuit in the reference mode or is asserted to place the clock and data recovery circuit in the data mode.

10. A programmable logic device integrated circuit clock and data recovery circuit that recovers digital data and an embedded clock from an incoming serial data stream, the clock and data recovery circuit comprising:

a first phase-locked loop that locks onto a reference clock when the clock and data recovery circuit is operated in a reference mode;

a second phase-locked loop that locks onto the incoming serial data stream when the clock and data recovery circuit is operated in a data mode; and a control circuit that automatically switches the clock and data recovery circuit between the reference mode and the data mode, wherein the first phase-locked loop includes:

a phase/frequency detector that has a reference clock input that receives the reference clock and a feedback clock input that receives a feedback clock, wherein the phase/frequency detector produces an output signal at its output that is indicative of whether the feedback clock matches the reference clock;

a charge pump that receives the output signal and produces a corresponding control signal;

a loop filter that filters the control signal from the charge pump and produces a corresponding loop filter output; and a voltage-controlled oscillator that receives the loop filter output and produces a corresponding feedback signal at its output on which the feedback clock is based.

11. A programmable logic device integrated circuit clock and data recovery circuit that recovers digital data and an embedded clock from an incoming serial data stream, the clock and data recovery circuit comprising:

a first phase-locked loop that locks onto a reference clock when the clock and data recovery circuit is operated in a reference mode;

a second phase-locked loop that locks onto the incoming serial data stream when the clock and data recovery circuit is operated in a data mode; and a control circuit that automatically switches the clock and data recovery circuit between the reference mode and the data mode, wherein the second phase-locked loop includes a phase detector that has a data input at which the data stream is received, wherein the phase detector has a phase detector output coupled to the charge pump, wherein the charge pump has switch circuitry responsive to a control signal from the control circuit, wherein the switch circuitry switches either the phase/frequency detector output signal or the phase detector output into the charge pump, and wherein the control circuit switches the first phase-locked loop or the second phase-locked loop into use by using the control signal to control the switch circuitry in response to override signals.

12. An integrated circuit clock and data recovery circuit that recovers digital data and an embedded clock from an incoming serial data stream, the clock and data recovery circuit comprising:

a reference clock input;

a recovered clock output;

a first phase-locked loop that receives a reference clock from the reference clock input, that locks onto the reference clock when the clock and data recovery circuit is operated in a reference mode, and that provides a corresponding reference clock signal directly to the recovered clock output when the clock and data recovery circuit is operated in the reference mode;

a serial data stream input that receives the serial data stream;

a second phase-locked loop that receives the serial data stream from the serial data stream input, that locks onto the incoming serial data stream when the clock and data recovery circuit is operated in a data mode, and that provides a corresponding recovered clock signal directly to the recovered clock output when the clock and data recovery circuit is operated in the data mode; and a control circuit that operates in an automatic mode in which the control circuit automatically switches the clock and data recovery circuit between the reference mode and the data mode, wherein when the control circuit receives an override signal, the control circuit exits the automatic mode.

13. An integrated circuit clock and data recovery circuit that recovers digital data and an embedded clock from an incoming serial data stream, the clock and data recovery circuit comprising:
- a first phase-locked loop that locks onto a reference clock when the clock and data recovery circuit is operated in a reference mode;
- a second phase-locked loop that locks onto the incoming serial data stream when the clock and data recovery circuit is operated in a data mode;
- a control circuit that operates in an automatic mode in which the control circuit automatically switches the clock and data recovery circuit between the reference mode and the data mode, wherein when the control circuit receives an override signal, the control circuit exits the automatic mode; and
- switch circuitry, wherein the first phase-locked loop produces a feedback signal and wherein when the override signal is received by the control circuit, the control circuit directs the switch circuitry to switch the first phase-locked loop into use so that the feedback signal is locked to the reference clock by the first phase-locked loop.

14. An integrated circuit clock and data recovery circuit that recovers digital data and an embedded clock from an incoming serial data stream, the clock and data recovery circuit comprising:
- a first phase-locked loop that locks onto a reference clock when the clock and data recovery circuit is operated in a reference mode;
- a second phase-locked loop that locks onto the incoming serial data stream when the clock and data recovery circuit is operated in a data mode;
- a control circuit that operates in an automatic mode in which the control circuit automatically switches the clock and data recovery circuit between the reference mode and the data mode, wherein when the control circuit receives an override signal, the control circuit exits the automatic mode; and
- switch circuitry, wherein the second phase-locked loop produces a feedback signal and wherein when the override signal is received by the control circuit, the control circuit directs the switch circuitry to switch the second phase-locked loop into use so that the feedback signal is locked onto the incoming serial data stream by the second phase-locked loop.

15. An integrated circuit clock and data recovery circuit that recovers digital data and an embedded clock from an incoming serial data stream, the clock and data recovery circuit comprising:
- a first phase-locked loop that locks onto a reference clock when the clock and data recovery circuit is operated in a reference mode;
- a second phase-locked loop that locks onto the incoming serial data stream when the clock and data recovery circuit is operated in a data mode;
- a control circuit that operates in an automatic mode in which the control circuit automatically switches the clock and data recovery circuit between the reference mode and the data mode, wherein when the control circuit receives an override signal, the control circuit exits the automatic mode, wherein the first and second phase-locked loops contain a shared charge pump having a switch circuit, a shared filter that filters charge pump output signals and produces corresponding filtered signals, and a shared oscillator that is controlled by the filtered signals, and wherein the first phase-locked loop comprises a phase/frequency detector that compares the reference clock to a feedback clock signal that is generated using the oscillator.

16. An integrated circuit clock and data recovery circuit that recovers digital data and an embedded clock from an incoming serial data stream, the clock and data recovery circuit comprising:
- a first phase-locked loop that locks onto a reference clock when the clock and data recovery circuit is operated in a reference mode;
- a second phase-locked loop that locks onto the incoming serial data stream when the clock and data recovery circuit is operated in a data mode; and
- a control circuit that operates in an automatic mode in which the control circuit automatically switches the clock and data recovery circuit between the reference mode and the data mode, wherein when the control circuit receives an override signal, the control circuit exits the automatic mode, wherein the first and second phase-locked loops contain a shared charge pump having a switch circuit, a shared filter that filters charge pump output signals and produces corresponding filtered signals, and a shared oscillator that is controlled by the filtered signals, and wherein the second phase-locked loop comprises a phase detector circuit that compares the incoming serial data stream clock to a feedback clock signal that is generated using the oscillator.

17. The integrated circuit clock and data recovery circuit defined in claim 12 further comprising at least one detector that produces at least one signal indicative of whether the first phase-locked loop has locked onto the reference clock, wherein the control circuit uses that at least one signal in automatically moving the clock and data recovery circuit from reference mode to data mode.

18. An integrated circuit clock and data recovery circuit that recovers digital data and an embedded clock from an incoming serial data stream, the clock and data recovery circuit comprising:
- a first phase-locked loop that locks onto a reference clock when the clock and data recovery circuit is operated in a reference mode;
- a second phase-locked loop that locks onto the incoming serial data stream when the clock and data recovery circuit is operated in a data mode;
- a control circuit that operates in an automatic mode in which the control circuit automatically switches the clock and data recovery circuit between the reference mode and the data mode, wherein when the control circuit receives an override signal, the control circuit exits the automatic mode; and
- at least one detector that produces a detector output that is indicative of whether the first phase-locked loop has locked onto the reference clock, wherein the control circuit uses the detector output to decide when to automatically move the clock and data recovery circuit from reference mode to data mode when the clock and data recovery circuit is in the automatic mode and wherein, when the override signal is received, the control circuit disregards the detector output and exits the automatic mode to place the clock and data recovery circuit in reference mode using the first phase-locked loop to lock onto the reference clock.

19. An integrated circuit clock and data recovery circuit that recovers digital data and an embedded clock from an incoming serial data stream, the clock and data recovery circuit comprising:
 a first phase-locked loop that locks onto a reference clock when the clock and data recovery circuit is operated in a reference mode;
 a second phase-locked loop that locks onto the incoming serial data stream when the clock and data recovery circuit is operated in a data mode;
 a control circuit that operates in an automatic mode in which the control circuit automatically switches the clock and data recovery circuit between the reference mode and the data mode, wherein when the control circuit receives an override signal, the control circuit exits the automatic mode; and
 at least one detector that produces a detector output that is indicative of whether the first phase-locked loop has locked onto the reference clock, wherein the control circuit uses the detector output to decide when to automatically move the clock and data recovery circuit from reference mode to data mode when the clock and data recovery circuit is in the automatic mode and wherein, when the override signal is received, the control circuit disregards the detector output and exits the automatic mode to place the clock and data recovery circuit in data mode using the second phase-locked loop to lock onto the incoming serial data stream.

20. A programmable logic device, comprising:
 a programmable element whose static programmed state is determined by loading configuration data into the programmable element from a source external to the programmable logic device, wherein when the programmable element is in its static programmed state, the programmable element produces a static control signal;
 a clock and data recovery circuit that recovers digital data and an embedded clock from an incoming serial data stream that is provided to the programmable logic device from a communications link, the clock and data recovery circuit including:
  a first phase-locked loop that locks onto a reference clock when the clock and data recovery circuit is operated in a reference mode;
  a second phase-locked loop that locks onto the incoming serial data stream when the clock and data recovery circuit is operated in a data mode;
  at least one detector that produces a detector output that is indicative of whether the first phase-locked loop has locked onto the reference clock; and
  a control circuit that, when the clock and data recovery circuit operates in an automatic mode, automatically switches the clock and data recovery circuit between the reference mode and the data mode based at least partly on the detector output, wherein the static control signal from the programmable element is used as an override signal that directs the control circuit to exit the automatic mode and to place the clock and data recovery circuit in a given one of either the reference mode or the data mode, regardless of the detector output.

21. The programmable logic device of claim 20 further comprising core logic that has been programmed to implement a process, wherein the process produces at least one dynamic override signal that is provided to the control circuit to cause the control circuit to exit the automatic mode.

22. The programmable logic device of claim 20, wherein the clock and data recovery circuit includes switch circuitry that the control circuit uses to switch either the first or second phase-locked loop into use depending on whether the clock and data recovery circuit is in the reference mode or the data mode, wherein the control circuit comprises logic that receives a lock-to-reference override signal and a lock-to-data signal and that produces a corresponding output control signal, wherein when the lock-to-reference signal is asserted, the control circuit adjusts the output control signal to direct the switch circuitry to switch the first phase-locked loop into use and when the lock-to-data signal is asserted, the control circuit adjusts the output control signal to direct the switch circuitry to switch the second phase-locked loop into use.

23. A method for controlling a programmable logic device integrated circuit clock and data recovery circuit comprising:
 implementing a process in programmable core logic on a programmable logic device by loading configuration data into the programmable logic device, wherein the process produces a dynamic override signal; and
 using the clock and data recovery circuit to either lock onto a reference clock or to lock onto an incoming serial data stream, wherein using the clock and data recovery circuit comprises:
  in an automatic mode, automatically switching the clock and data recovery circuit back and forth repeatedly between a first mode in which the clock and data recovery circuit locks onto the reference clock and a second mode in which the clock and data recovery circuit locks onto the incoming serial data stream; and
  in response to the dynamic override signal, exiting the automatic mode and placing the clock and data recovery circuit into either the first mode or the second mode.

24. The method defined in claim 23 wherein using the clock and data recovery circuit to either lock onto the reference clock or to lock onto the incoming serial data stream comprises using a first phase-locked loop in the clock and data recovery circuit to lock onto the reference clock or using a second phase-locked loop in the clock and data recovery circuit to lock onto the incoming serial data stream.

25. The method defined in claim 23 wherein the process comprises an oversampling process that generates a lock-to-reference override signal and wherein exiting the automatic mode comprises exiting the automatic mode to place the clock and data recovery circuit into the first mode in response to the lock-to-reference override signal.

26. The method defined in claim 23 wherein the process produces a lock-to-date override signal and wherein exiting the automatic mode comprises exiting the automatic mode to place the clock and data recovery circuit into the second mode in response to the lock-to-date override signal.

* * * * *